United States Patent
Cook et al.

(10) Patent No.: US 6,524,496 B2
(45) Date of Patent: Feb. 25, 2003

(54) AZEOTROPE-LIKE COMPOSITION OF 1,1,1,3,3-PENTAFLUOROPROPANE AND 1-CHLORO-1,1,3,3,3-PENTAFLUOROPROPANE

(75) Inventors: Kane David Cook, Erie County, NY (US); Rajiv Ratna Singh, Erie County, NY (US); Hsueh Sung Tung, Erie County, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/813,501

(22) Filed: Mar. 21, 2001

(65) Prior Publication Data

US 2002/0177537 A1 Nov. 28, 2002

(51) Int. Cl.[7] .............................. C09K 5/04; B01D 3/02
(52) U.S. Cl. ............................................ 252/67; 203/81
(58) Field of Search ............................... 252/67; 203/81

(56) References Cited

FOREIGN PATENT DOCUMENTS

| EP | 728720 | * | 8/1996 |
|---|---|---|---|
| WO | WO 95/04022 | * | 2/1995 |

* cited by examiner

Primary Examiner—John Hardee
(74) Attorney, Agent, or Firm—Colleen D. Szuch

(57) ABSTRACT

Provided are azeotropic and azeotrope-like mixtures of 1,1,1,3,3-pentafluoropropane (HFC-245fa) and 1-chloro-1,1,3,3,3-pentafluoropropane (HCFC-235fa) that are useful as intermediates in the production of HFC-245fa. A process for separating HFC-245fa and HCFC-235fa is also provided. HFC-245fa is useful as a nontoxic, zero ozone depleting fluorocarbon useful as solvents, blowing agents, refrigerants, cleaning agents, aerosol propellants, heat transfer media, gaseous dielectrics, fire extinguishing compositions and power cycle working fluids.

8 Claims, No Drawings

AZEOTROPE-LIKE COMPOSITION OF 1,1,1, 3,3-PENTAFLUOROPROPANE AND 1-CHLORO-1,1,3,3,3-PENTAFLUOROPROPANE

FIELD OF THE INVENTION

The present invention pertains to azeotropic and azeotrope-like compositions of 1,1,1,3,3-pentafluoropropane and 1-chloro-1,1,3,3,3-pentafluoropropane. The compositions of the invention find use not only as intermediates in the production of 1,1,1,3,3-pentafluoropropane, but they are additionally useful as refrigerants, blowing agents and solvents.

BACKGROUND

In recent years there has been universal concern that completely halogenated chlorofluorocarbons (CFC's) might be detrimental to the Earth's ozone layer. Consequently, there is a worldwide effort to use fluorine-substituted hydrocarbons which contain fewer or no chlorine substituents. In this regard, 1,1,1,3,3-pentafluoropropane (HFC-245fa), a hydrofluorocarbon having zero ozone depletion potential, is being considered as a replacement for chlorofluorocarbons such as dichlorodifluoromethane in refrigeration systems and trichlorofluoromethane as a blowing agent. The production of HFC's, i.e. compounds containing only carbon, hydrogen and fluorine has been the subject of interest to provide environmentally desirable products for use as solvents, blowing agents, refrigerants, cleaning agents, aerosol propellants, heat transfer media, dielectrics, fire extinguishing compositions and power cycle working fluids. It is known in the art to produce fluorocarbons such as HFC's by reacting hydrogen fluoride with various hydrochlorocarbon compounds.

HFC-245fa is well known in the art and may be prepared according to the process described in U.S. Pat. No. 5,574, 192, herein incorporated by reference in its entirety.

It has now been found that an important intermediate in the production of substantially pure HFC-245fa, is an azeotrope or azeotrope-like mixture of 1,1,1,3,3-pentafluoropropane and 1-chloro-1,1,3,3,3-pentafluoropropane (HCFC-235fa). This intermediate, once formed, may thereafter be separated into its component parts by extraction techniques or pressure swing distillation, even though they have close boiling points. HFC-245fa and HCFC-23 5fa have boiling points of has a boiling point of 15.1° C. and 27.57° C., respectively at 745.8 mmHg. Alternatively, the HCFC-235fa may be converted to a more highly fluorinated hydrofluorocarbon such as 1,1,1,3,3,3-hexafluoropropane (HFC-236fa), which may be separated from HFC-245fa by conventional means.

SUMMARY OF THE INVENTION

In one embodiment, the invention provides azeotropic or azeotrope-like compositions comprising effective amounts of 1,1,1,3,3-pentafluoropropane and 1-chloro-1,1,3,3,3-pentafluoropropane. By "effective amounts" is meant the amount of each component that, on combination with the other component, results in the formation of an azeotropic or azeotrope-like composition.

An azeotropic composition consisting essentially of 1,1, 1,3,3-pentafluoropropane and 1-chloro-1,1,3,3,3-pentafluoropropane has been found to have a boiling point of about 14.95° C. at a pressure of from about 0 and about 60 psig. At a pressure of about 0 psig the azeotropic composition contains about 650 ppm 1-chloro-1,1,3,3,3-pentafluoropropane. At a pressure of about 10 psig the azeotropic composition contains about 23 ppm 1-chloro-1, 1,3,3,3-pentafluoropropane.

The azeotrope-like compositions of the invention consist essentially of greater than 0 to about 50 weight percent 1-chloro-1,1,3,3,3-pentafluoropropane and about 50 to less than 100 weight percent 1, ,1 ,3,3-pentafluoropropane. In a preferred embodiment, the invention provides azeotrope-like compositions consisting essentially of about 1 weight percent 1-chloro-1,1,3,3,3-pentafluoropropane and about 99 weight percent 1,1,1,3,3-pentafluoropropane. The azeotrope-like compositions of the invention have boiling points of about 14.95±0.15° C. at a pressure of about 746 mmHg.

In another embodiment, the present invention provides a process for separating 1,1,1,3,3-pentafluoropropane from an azeotropic or azeotrope-like mixture of 1,1,1,3,3-pentafluoropropane and 1-chloro-1,1,3,3,3-pentafluoropropane, which process comprises, consists essentially of, or consists of the steps of:

(A) distilling a mixture comprising, consisting essentially of, or consisting of at least an azeotropic mixture of 1,1,1,3,3-pentafluoropropane and 1-chloro-1,1,3,3,3-pentafluoropropane at a first pressure to produce a first overhead stream enriched in either the 1,1,1,3,3-pentafluoropropane or 1-chloro-1,1,3,3,3-pentafluoropropane and a first bottoms stream enriched in the other component; and (B) redistilling the first overhead stream at a second pressure to produce a second overhead stream enriched in the component enriched in the first bottoms stream and a second bottoms stream enriched in the component enriched in the first overhead stream.

DETAILED DESCRIPTION

In a method of preparing HFC-245fa, precursor reagents are fluorinated with hydrogen fluoride. The reaction products of such precursors include HFC-245fa, unreacted HF and other by-products. Upon removal of the by-products, a binary azeotrope or azeotrope-like composition of HFC-245fa and HCFC-235fa is formed. This binary azeotrope or azeotrope-like composition is then available for separation into its component parts. The azeotropic or azeotrope-like compositions of the HFC-245fa and HCFC-235fa are also useful as recycle to the fluorination reactor. Thus, for example, in a process for producing HFC-245fa, one can recover a portion of the HFC-245fa as an azeotropic or azeotrope-like composition of HFC-245fa and HCFC-235fa and then recycle the composition to the reactor.

HFC-245fa forms azeotrope-like and azeotrope-like mixtures with HCFC-235fa. The thermodynamic state of a fluid is defined by its pressure, temperature, liquid composition and vapor composition. For a true azeotrope-like composition, the liquid composition and vapor phase are essentially equal at a given temperature and pressure range. In practical terms this means that the components cannot be separated during a phase change. For the purpose of this invention, an azeotrope-like composition means that the composition behaves like a true azeotrope in terms of its constant boiling characteristics and tendency not to fractionate upon boiling or evaporation. During boiling or evaporation, the liquid composition changes only slightly, if at all. This is in contrast with non-azeotrope-like compositions in which the liquid and vapor compositions change substantially during evaporation or condensation. One way to determine whether a candidate mixture is azeotrope-like within the meaning of this invention, is to distill a sample of it under conditions which would be expected to separate the mixture into its separate components. If the mixture is a non-azeotrope or non-azeotrope-like, the mixture will fractionate, i.e. separate into its various: components with the lowest boiling component distilling off first, and so on. If the mixture is azeotrope-like, some finite amount of the first distillation cut will be obtained which contains all of the mixture components and which is constant boiling or behaves like a single substance. Another characteristic of azeotrope-like compositions is that there is a range of compositions containing the same components in varying proportions which are azeotrope-like. All such compositions are included by the term azeotrope-like as used herein. As an example, it is well known that at different pressures the composition of a given azeotrope will vary at least slightly as does the boiling point of the composition. Thus an azeotrope of two components represents a unique type of relationship but with a variable composition depending on the temperature and/or pressure. As is well known in the art, the boiling point of an azeotrope will vary with pressure.

As used herein, an azeotrope is a liquid mixture that exhibits a maximum or minimum boiling point relative to the boiling points of surrounding mixture compositions. An azeotrope or an azeotrope-like composition is an admixture of two or more different components which, when in liquid form under given pressure, will boil at a substantially constant temperature, which temperature may be higher or lower than the boiling temperatures of the components and which will provide a vapor composition essentially identical to the liquid composition undergoing boiling. For the purpose of this invention, azeotrope-like compositions are defined to include azeotrope-like compositions which means a composition that behaves like an azeotrope, i.e., has constant-boiling characteristics or a tendency not to fractionate upon boiling or evaporation. Thus, the composition of the vapor formed during boiling or evaporation is the same as or substantially the same as the original liquid composition. Hence, during boiling or evaporation, the liquid composition, if it changes at all, changes only to a minimal or negligible extent. This is in contrast with non-azeotrope-like compositions in which during boiling or evaporation, the liquid composition changes to a substantial degree. Accordingly, the essential features of an azeotrope or an azeotrope-like composition are that at a given pressure, the boiling point of the liquid composition is fixed and that the composition of the vapor above the boiling composition is essentially that of the boiling liquid composition, i.e., essentially no fractionation of the components of the liquid composition takes place. Both the boiling point and the weight percentages of each component of the azeotrope-like composition may change when the azeotrope or azeotrope-like liquid composition is subjected to boiling at different pressures. Thus, an azeotrope or an azeotrope-like composition may be defined in terms of the relationship that exists between its components or in terms of the compositional ranges of the components or in terms of exact weight percentages of each component of the composition characterized by a fixed boiling point at a specified pressure.

The present invention provides a composition which comprises effective amounts of HFC-245fa and HCFC-235fa to form an azeotropic or azeotrope-like composition. By effective amount is meant an amount of each component which, when combined with the other component, results in the formation of an azeotrope or azeotrope-like mixture. The inventive compositions preferably are binary azeotropes which consist essentially of combinations of only HFC-245fa with HCFC-235fa.

The following non-limiting examples serve to illustrate the invention.

EXAMPLE 1

Preparation of HFC-245fa

Approximately 400 pounds of antimony pentachloride catalyst is charged into a 50 gallon reactor. The reactor temperature is raised to 95° C. About 25 lbs/hour of HCC-240fa, 15 lbs/hour of HF and 2 lbs/hour of chlorine are fed to the reactor continuously. Chlorine is used to keep the catalyst active. The reactor pressure is maintained at about 200 psig. The product stream contains HFC-245fa, 1-chloro-1,1,3,3,3-pentafluoropropane (HCFC-235fa), HF, HCl and organic by-products such as 1,3,3,3-tetrafluoropropene, 1-chloro-3,3,3-trifluoropropene, and 1-chloro-3,3,3-tetrafluoropropene among others.

EXAMPLE 2

Azeotropic Screen of HFC-245fa and HCFC-235fa

Using an automated comparative ebuilliometer indications were seen that an azeotrope exists between HFC-245fa and HCFC-235fa. This determination was made by observing that when the high boiler (pure HCFC-235fa, b.p. 27.57° C. at 745.8 mmHg; 22° C.) was added to the pot containing HFC-245fa (boiling at 14.95° C. at the same pressure the temperature in the pot dropped (0.01 to 0.1 5° C.) from an equilibrated temperature and never recovered. The lowering of the boiling point on addition of the high boiler proved that an azeotrope was formed. It was also determined that the amount of HCFC-235 in the azeotropic composition is extremely small (0 to 700 ppm).

EXAMPLE 3

Separation of an HFC-245fa/HCFC-235fa Mixture

A 500 g sample of a mixture containing 99 wt. % HFC-245fa and 1 wt. % HCFC-235fa was charged in a 40 stage still. The sample was distilled at different pressures under total reflux conditions. The results are shown in Table I.

| Pressure (psig) | Wt. % HCFC-235fa |
|---|---|
| 0 | 650 ppm |
| 10 | 23 ppm |
| 30 | 0 |
| 60 | 0 |

The fact that even under total reflux HCFC-235fa, a higher boiling point liquid, appeared in the overhead shows that the mixture is azeotropic and the azeotropic composition is 650 ppm at 0 psig. The results show that the azeotrope breaks down at higher pressures (and corresponding temperatures) showing that the azeotropic composition is pressure-dependent and a pressure-dependent distillation may be used to separate the two.

What is claimed is:

1. An azeotropic or azeotrope-like composition consisting essentially of from about 95 to less than about 100 weight percent 1,1,1,3,3-pentafluoropropane and greater than zero to about 5 weight percent 1-chloro-1,1,3,3,3-pentafluoropropane.

2. The azeotropic or azeotrope-like composition of claim 1 having a boiling point of from about 14.95±0.15° C. at a pressure of from about 0 to about 60 psig.

3. The azeotropic or azeotrope-like composition of claim 2 consisting essentially of about 1 weight percent 1-chloro-1,1,3,3,3-pentafluoropropane and 99 weight percent 1,1,1,3,3-pentafluoropropane.

4. The azeotropic composition of claim 2 wherein the 1-1-chloro-1, 1,3,3,3-pentafuoropropane in present in an amount of about 650 ppm at about 0 psig.

5. The azeotropic composition of claim 2 wherein the 1-chloro-1,1,3,3,3-pentafluoropropane in present in an amount of about 23 ppm at about 10 psig.

6. A process for separating 1,1,1,3,3-pentafluoropropane from an azeotropic or azeotrope-like mixture of 1,1,1,3,3-pentafluoropropane and 1-chloro-1,1,3,3,3-pentafluoropropane, which process comprises, consists essentially of, or consists of the steps of:

(A) distilling a mixture comprising, consisting essentially of, or consisting of at least an azeotropic mixture of 1,1,3,3-pentafluoropropane and 1-chloro-1,1,3,3,3-pentafluoropropane at a first pressure to produce a first overhead stream enriched in either the 1,1,1,3,3-pentafluoropropane or 1-chloro-1,1,3,3,3-pentafluoropropane and a first bottoms stream enriched in the other component; and (B) redistilling the first overhead stream at a second pressure to produce a second overhead stream enriched in the component enriched in the first bottoms stream and a second bottoms stream enriched in the component enriched in the first overhead stream.

7. The process of claim 6 wherein the first distillation pressure is from about 10 to about 20 psia and the second distillation pressure is from about 20 psia to about 200 psia.

8. The process of claim 6 wherein the first distillation pressure is from about 14 to about 20 psia and the second distillation pressure is from about 20 psia to about 100 psia.

* * * * *